United States Patent [19]

Masnik et al.

[11] Patent Number: 5,092,631
[45] Date of Patent: Mar. 3, 1992

[54] SAFETY ENCLOSURE FOR GAS LINE FITTINGS

[75] Inventors: Matthew G. M. Masnik, Hopedale; Robert C. Martel, Tewskbury, both of Mass.

[73] Assignee: Digital Equipment Corporation, Maynard, Mass.

[21] Appl. No.: 722,834

[22] Filed: Jun. 28, 1991

[51] Int. Cl.⁵ .............................................. F16L 55/07
[52] U.S. Cl. .................................. 285/14; 285/80; 285/419; 285/423
[58] Field of Search .................. 285/14, 80, 373, 419, 285/423

[56] References Cited

U.S. PATENT DOCUMENTS

| | | | |
|---|---|---|---|
| 1,814,412 | 7/1931 | Rutten | 285/80 X |
| 2,048,424 | 7/1936 | Caldwell | 285/80 X |
| 4,630,456 | 12/1986 | Nielsen | 285/80 X |
| 4,826,215 | 5/1989 | Sullivan | 285/80 |

FOREIGN PATENT DOCUMENTS

| | | | |
|---|---|---|---|
| 105956 | 11/1938 | Australia | 285/14 |
| 2389067 | 12/1978 | France | 285/14 |
| 17258 | of 1906 | United Kingdom | 285/80 |

Primary Examiner—Dave W. Arola
Attorney, Agent, or Firm—Arnold, White & Durkee

[57] ABSTRACT

A safety enclosure for gas line fittings is disclosed. The enclosure comprises a generally cylindrical housing formed to easily enclose and identify fittings on gas lines containing dangerous or toxic gases. The enclosures identify the potentially dangerous fittings and prevent opening of the fittings while the enclosure is in place.

3 Claims, 1 Drawing Sheet

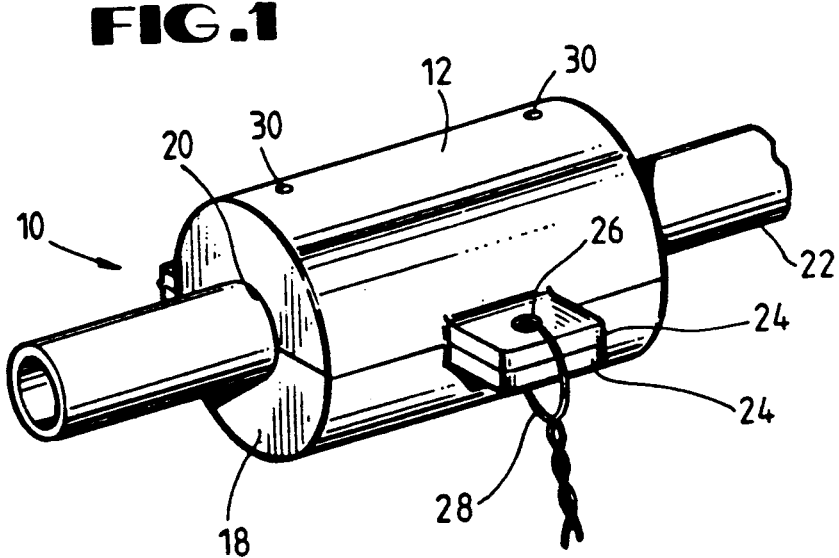
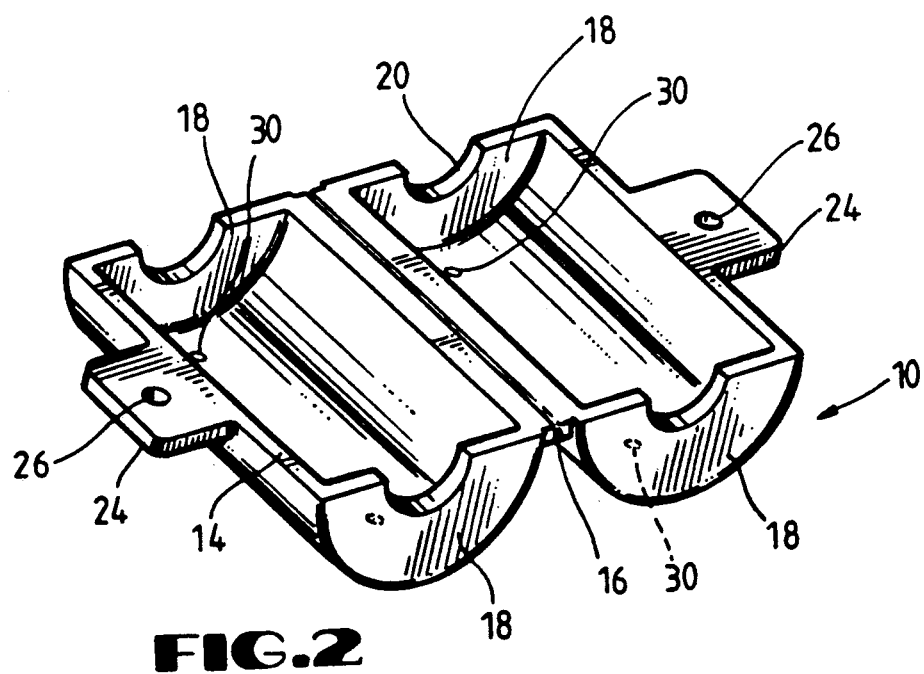

SAFETY ENCLOSURE FOR GAS LINE FITTINGS

BACKGROUND OF THE INVENTION

1. Field of the Invention

The present invention relates to safety devices for tubing fittings used on gas lines. More particularly, the invention relates to devices for marking fittings on gas tubing conveying potentially dangerous gases.

2. Prior Art

Many different industries utilize several different gases at a single work station. These gases are normally supplied from cylinders, tanks or bottles and are connected to a panel or cabinet by stainless steel tubing. Compression fittings are used to connect the tubing to the panel and cylinder, and to sometimes make connections along the length of the tubing.

Depending upon the industry and the particular work station, the gases connected to the panel can be relatively safe and inert, such as nitrogen and helium, or can be dangerous and toxic, such as silane.

Since all of the lines and fittings are identical, there is no way to tell what type of gas is in a line without having some type of external labelling system or tracing the line back to its source. The most common labelling system is simply a piece of tape wrapped around each line on which is written the identification of the gas in the line. This type of labelling has several shortcomings and disadvantages. For example, the adhesive on the tape often dries up and the label falls off. Additionally, writing on the label can become faded or washed off so that the identity of the gas in the line is not known. Thus, a technician adjusting the fittings cannot easily determine whether the gas in the line is inert or dangerous without tracing the line back to its source. Accordingly, if the technician accidently confuses one or more lines, he could inadvertently open a dangerous line.

Because of the dangerous nature of some of the gases used in industry, it is clear that there is a need for a means to identify fittings on potentially dangerous gas lines to prevent their accidental or inadvertent opening. It would be a significant advancement if such a device were relatively inexpensive, easy to use and readily identifiable. Such an apparatus is disclosed and claimed herein.

SUMMARY OF THE INVENTION

The present invention provides a safety enclosure for gas line fittings to identify and prevent accidental opening of lines containing dangerous or toxic gases.

In the preferred embodiment of the invention, the safety enclosure comprises a generally cylindrical plastic housing having substantially identical halves. The two halves of the housing are hinged along one common side and open on the other side such that the enclosure can be opened and placed over a gas fitting.

The ends of the housing include plates having an opening passing therethrough which is sized to correspond to the tubing or the fitting itself. The opening is smaller than the nut used on the fitting to prevent the enclosure from sliding off the fitting and down the gas line.

A tab or projection extends outward on each of the halves of the housing on the side opposite the hinge. These projections provide a means for locking the enclosure over the fitting. In the preferred embodiment, the projections are generally rectangular in shape and include an aperture passing through the center thereof through which a fastener can be passed. Suitable fasteners include twist ties, metal tags, and sealed metal tags.

A small port is also formed in the housing of the enclosure to permit any gases which might leak from the fitting to escape from the enclosure. Thus, the integrity of the fittings can easily be monitored by standard sensing equipment.

The invention is best understood by reference to the following detailed description when read in light of the accompanying drawings.

BRIEF DESCRIPTION OF THE DRAWINGS

FIG. 1 is a perspective view of the safety enclosure of the present invention secured to a gas line.

FIG. 2 is a perspective view of the interior of the safety enclosure of the present invention illustrated in the open position.

DETAILED DESCRIPTION OF THE PREFERRED EMBODIMENTS

The present invention provides a safety device which can be placed over fittings on gas lines to identify dangerous or toxic lines and to prevent accidental or inadvertent opening of those lines.

Referring to FIGS. 1 and 2, the safety enclosure of the present invention is generally referred to at 10. Enclosure 10 is preferably molded from plastic and includes a housing 12 formed from symmetrical halves 14. Halves 14 are connected along a common side by a hinge 16. Accordingly, an open enclosure 10 as illustrated in FIG. 2 can easily be placed adjacent a fitting and then closed as illustrated in FIG. 1 such that it encases the gas fitting.

The end of each half 14 includes a semicircular plate 18 which encloses the end of housing 12. When enclosure 10 is closed, plates 18 leave an opening 20 which is sized to receive tubing 22 or a portion of a gas fitting. Opening 20 should be small enough that a nut on the fitting cannot pass through opening 20. Thus, enclosure 10 will not slip off the fitting and slide down the tubing.

A projection 24 extends outward from the side of each half 14 opposite hinge 16. In the illustrated embodiment, projections 14 are generally rectangular in shape and are adjacent each other when enclosure 10 is closed. Projections 24 include an aperture 26 through which a fastening means 28 can be secured. Many different types of fastening means can be used including twist ties, metal tags, and sealed metal tags.

A small port 30 is formed in each half 14 of housing 12. Ports 30 permit any gases which might leak from the fitting to escape from enclosure 10. Accordingly, standard sensing equipment can easily be used to monitor the integrity of the connections made by the fittings within enclosure 10. While port 30 has been illustrated as a small hole in each half of enclosure 10, it will readily be appreciated by those skilled in the art that various shapes, sizes and numbers of ports could be formed in housing 12 for this purpose.

The enclosure of the present invention can include additional features which add to its effectiveness as a safety device. For example, enclosure 10 can be formed from red plastic to convey a warning of danger if used only on dangerous lines. Alternatively, the enclosures can be formed from different colors for different gases or the name of the gas could be molded into the plastic housing itself.

While the invention has been described with respect to the presently preferred embodiments, it will be appreciated by those skilled in the art that numerous changes and modifications can be made to the invention without departing from its scope or essential characteristics. For example, while housing 10 has been illustrated as being cylindrical, it will be appreciated that other configurations such as those having hexagonal or octagonal cross-sections could also be used. Additionally, many different types of projections and fastening means could be used to secure enclosure 10 after it has been placed over a fitting. Accordingly, the foregoing description is meant to be illustrative and not restrictive and the following claims are intended to embrace all such modifications and changes.

What is claimed is:

1. A safety enclosure for gas line fittings comprising:
   a generally cylindrical housing, said housing being longitudinally divided into symmetrical first and second halves by a longitudinal plane passing through the center of said housing;
   a hinge comprising a thin, pliable band integrally formed between common longitudinal sides of the first and second housing halves, such that the housing can be opened and closed;
   end plates formed on the ends of said housing, said end plates being generally semicircular in configuration and forming an opening through which a gas line can pass when said housing is closed, said openings being sized such that they do not permit passage of said fitting with nuts thereon; and
   projections extending from each of said halves on a side opposite said hinge, said projections cooperating to provide a means for securing said enclosure about said fitting in the closed postion.

2. A safety enclosure according to claim 1 wherein said projections are adjacent each other wherein said housing is closed and each projection includes an aperture through which a fastening means can be inserted and secured.

3. A safety enclosure according to claim 1 further comprising a port formed within said housing for permitting gases to exit from said housing.

* * * * *